United States Patent [19]
Molino

[11] 3,871,688
[45] Mar. 18, 1975

[54] DUCT JOINING MEANS

[76] Inventor: Angelo R. Molino, 816 E. Bldg., Haddonview Apts., Haddonfield, N.J. 08033

[22] Filed: Dec. 26, 1972

[21] Appl. No.: 318,005

[52] U.S. Cl................. 285/189, 29/193, 285/424
[51] Int. Cl............................................ F16l 23/00
[58] Field of Search ......... 29/180 S, 180 R, 180 SS, 29/183, 191, 191.6, 413; 285/424, 189

[56] References Cited
UNITED STATES PATENTS

| | | | |
|---|---|---|---|
| 596,817 | 1/1898 | Mallen | 285/424 X |
| 1,925,804 | 9/1933 | Hiering | 72/335 |
| 2,221,854 | 11/1940 | Zalkind | 285/424 X |
| 2,491,700 | 12/1949 | Zwerling | 285/424 X |
| 2,965,397 | 12/1960 | Vandenberg | 285/424 X |
| 3,672,707 | 6/1972 | Russo et al. | 285/424 X |
| 3,712,650 | 1/1973 | Mez | 285/424 X |

FOREIGN PATENTS OR APPLICATIONS

| 226,784 | 2/1960 | Australia | 29/190 |
|---|---|---|---|

Primary Examiner—Winston A. Douglas
Assistant Examiner—O. F. Crutchfield
Attorney, Agent, or Firm—Jacob Trachtman

[57] ABSTRACT

Means for joining a sheet metal duct at an opening in a sheet metal panel or wall which includes an elongated sheet metal strip having a U-shaped portion extending longitudinally along the strip, separate flanges projecting from the ends of the legs of the U-shaped portion and a plurality of longitudinally spaced slits through one of the flanges at its junction with its respective leg of the U-shaped portion. The joining member is made by an apparatus which includes a plurality of mating male and female die members which form the U-shaped portion as a sheet metal strip is passed between the die members, and a slitter member for forming the slits in one of the flanges.

5 Claims, 9 Drawing Figures

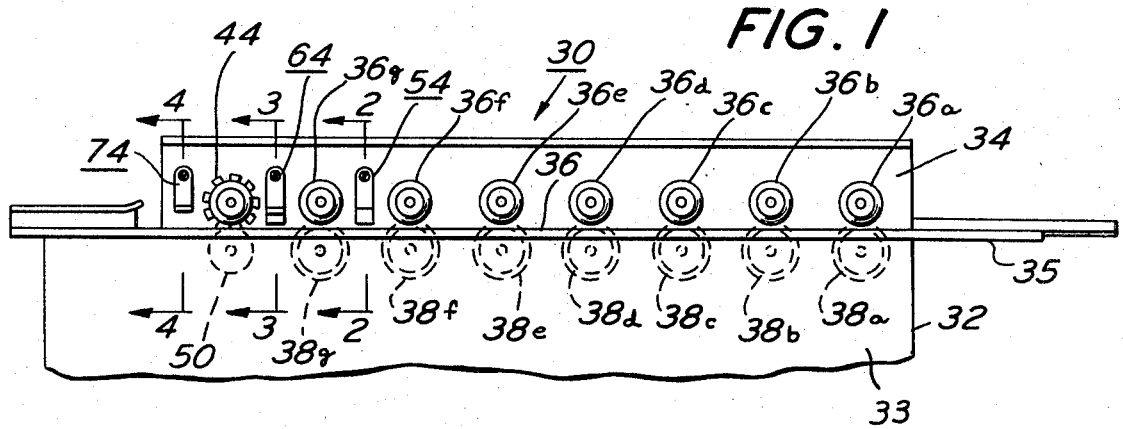
FIG. 1
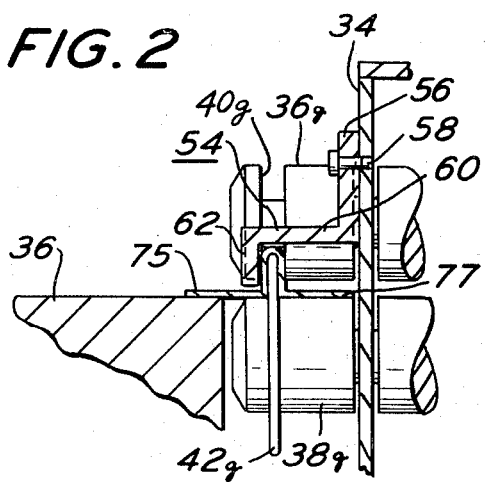
FIG. 2
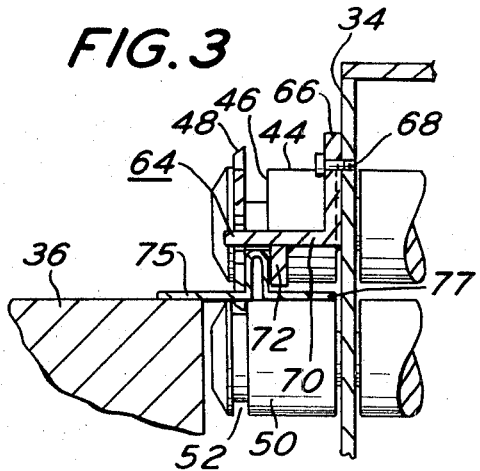
FIG. 3
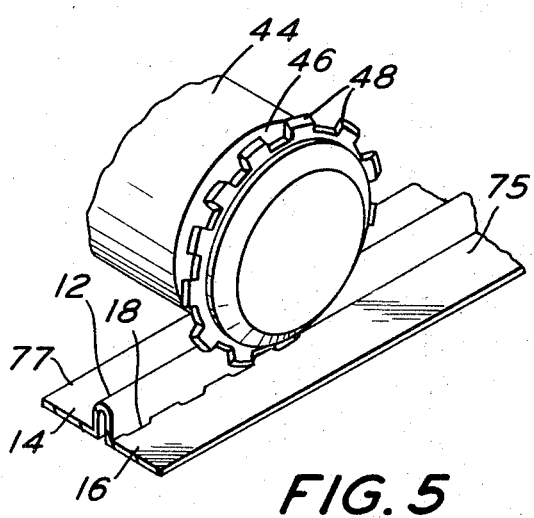
FIG. 5
FIG. 4
INVENTOR
ANGELO R. MOLINO
BY
Jacob Trachtman
ATTORNEY

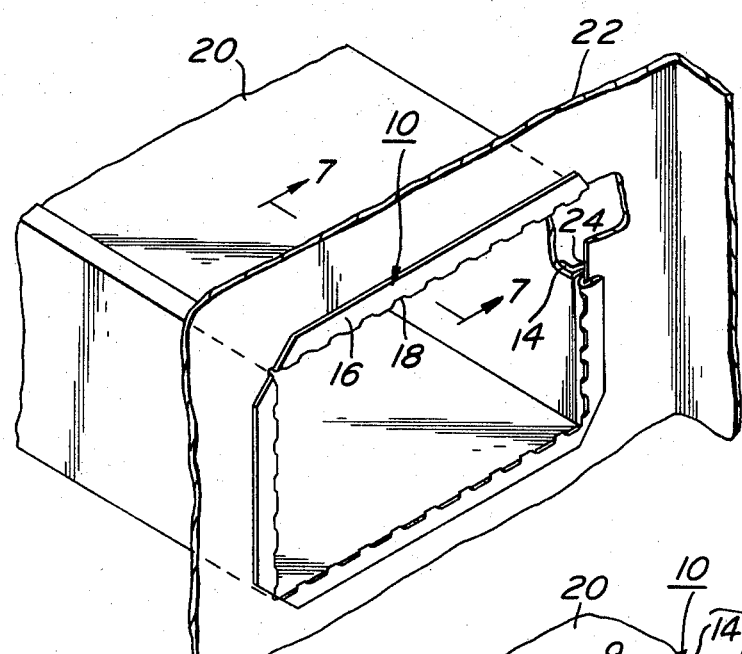
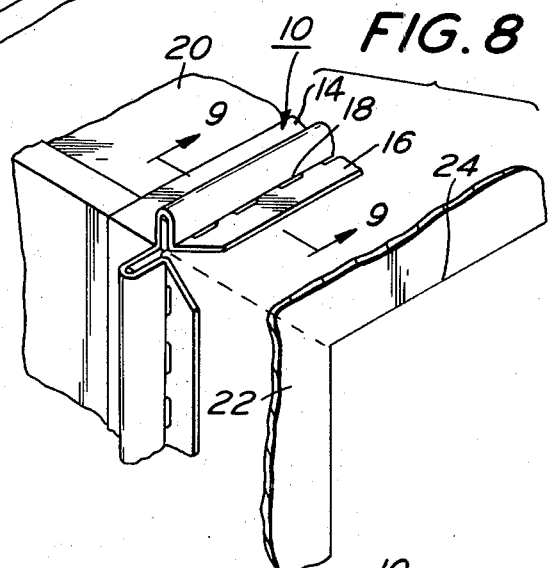
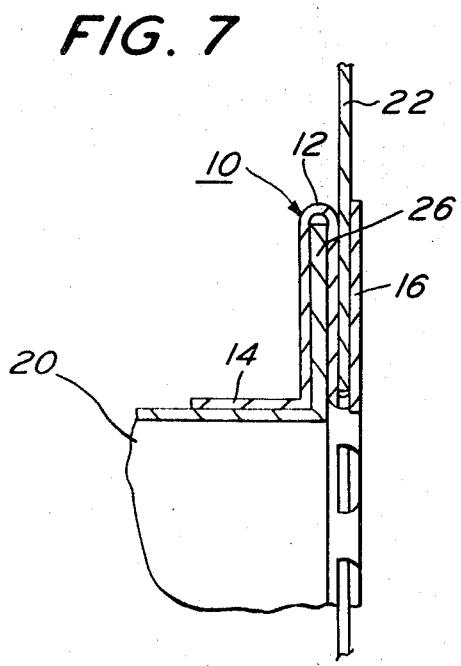
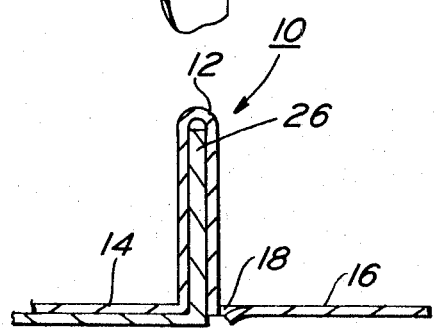

DUCT JOINING MEANS

The present invention relates to a duct joining means for joining a sheet metal duct at an opening in a sheet metal panel or wall, and an apparatus for making the duct joining means.

In assembling sheet metal ductwork of the type used in heating, ventilating and air conditioning systems, it is often necessary to connect the end of a duct at an opening in a sheet metal panel or wall. For example, such systems generally include a main supply duct having branch lines connected in openings in the wall of the main supply duct. Such ductwork systems are generally assembled manually at the site of use. To facilitate the assembling of the system it is desirable that the duct joining means be capable of being easily and quickly joined to the duct and the panel or wall to which the duct is being joined. Also, the duct joining means should form a relatively air tight joint between the duct and the wall or panel. Furthermore, since a ductwork system may require ducts of different sizes to be joined to the panel or wall, it is desirable to have a duct joining means which can be easily fitted to different sizes of ducts.

It is therefore an object of the present invention to provide a novel sheet metal duct joining means for joining a duct to an opening in a wall or panel.

It is another object of the present invention to provide a duct joining means for joining a sheet metal duct at an opening in a sheet metal wall or panel which can be easily and quickly connected to the duct and wall or panel.

It is still another object of the present invention to provide a duct joining means for easily and quickly joining a sheet metal duct at an opening in a sheet metal wall or panel which provides a substantially air tight joint.

It is a further object of the present invention to provide a duct joining means which can be readily fitted to ducts of different sizes.

It is still another object of the present invention to provide an apparatus for making a sheet metal duct joining means.

Other objects will appear hereinafter.

These objects are achieved by a duct joining member which includes an elongated sheet metal strip having a U-shaped portion extending longitudinally along the strip, separate flanges extending from the legs of the U-shaped portion, and a plurality of longitudinally spaced slits extending through one of the flanges to permit ease of bending the flange. The duct joining strip is formed by an apparatus which includes die means for forming the U-shaped portion and slitter means for forming the slits.

IN THE DRAWINGS

FIG. 1 is a front elevational view of the forming apparatus of the present invention;

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 1;

FIG. 5 is a perspective view of the slitting wheel of the apparatus of the present invention;

FIG. 6 is a perspective view showing a duct mounted on a wall by the duct joining member of the present invention;

FIG. 7 is a sectional view taken along line 7—7 of FIG. 6;

FIG. 8 is an exploded perspective view showing the duct joining member of the present invention on a duct and ready for joining the duct to a wall; and FIG. 9 is a sectional view of the duct joining member taken along line 9—9 of FIG. 8.

Referring initially to FIGS. 6-9, the duct joining member of the present invention is generally designated as 10. Duct joining member 10 comprises an elongated sheet metal strip having a U-shaped portion 12 extending longitudinally along the strip between its longitudinal edges, and separate flanges 14 and 16 projecting from the ends of the legs of the U-shaped portion 12. As shown in FIG. 9, the flanges 14 and 16 are co-planar and extend substantially perpendicularly to the legs of the U-shaped portion 12. As shown in FIG. 8, the flange 16 has a plurality of longitudinally spaced slits 18 therethrough at the junction of the flange 16 and the U-shaped portion 12.

As shown in FIGS. 6-8, the duct joining member 10 is used to join the end of a sheet metal duct 20 to a sheet metal panel or wall of another duct 22 at an opening 24 in the panel or wall. This is achieved by providing the duct 20 with a flange 26 projecting outwardly from the end of each side of the duct substantially perpendicular to the side of the duct. A duct joining member 10 is mounted on each of the four flanges 26 of the duct 20 with each flange 26 extending between the legs of the U-shaped portion 12 and the flange 14 extending along the outer surface of the side of the duct 20 as shown in FIG. 7. The duct joining member 10 mounted on each flange 26 of the duct 20 is of a length corresponding to the length of the flange 26.

With a duct joining member 10 mounted on each of the flanges 26 of the duct 20 as shown in FIG. 8, the flanges 16 of the duct joining member 10 are inserted through the opening 24 in the panel or wall 22. The opening 24 is of a shape and size corresponding to the cross-sectional shape and size of the duct 20. Thus, each of the flanges 16 of the duct joining members 10 extend along a side of the opening 24. The flanges 16 are inserted through the opening 24 until each of the U-shaped portions 12 of the duct joining members 10 engages the wall or panel 22 as shown in FIG. 7. The flanges 16 are then bent outwardly along the inside surface of the wall or panel 22 as shown in FIGS. 6 and 7. The slits 18 in the flanges 16 permit the bending of the flanges 16 with relative ease. Since the flanges 16 are each continuous in length, the entire flange can be bent outwardly at the same time. This provides for greater ease of attaching the joining members 10 to the wall or panel 22. When the flanges 16 are bent outwardly, the wall or panel 22 is clamped between the U-shaped portion 12 and the flanges 16 as shown in FIG. 7 to secure the joining member 10 to the wall or panel 22. Since the flanges 26 on the end of the duct 20 are secured within the U-shaped portion 12, the duct 20 is joined to the wall or panel 22 as shown in FIG. 6.

Referring to FIGS. 1-5, there is shown an apparatus, generally designated as 30, for forming the duct joining members 10. The forming apparatus 30 comprises a base 32 having a vertical front surface 33, a vertical mounting wall 34, extending parallel to the front of the base 32, and a guide wall 35 adjacent to but below the top of the mounting wall 34. The guide wall 35 extends horizontally along the front of the mounting wall 34. A plurality of female die members 36a, 36b, 36c, 36d, 36e, 36f and 36g are mounted in spaced, horizontally aligned relation on the mounting wall 34. A plurality of male die members 38a–38g are mounted in spaced, horizontally aligned relation on the mounting wall 34 with each of the male die members being vertically below and in mating relation with a separate one of the female die members.

As shown in FIG. 2, the female die member 36g is a cylindrical member which is supported for rotation about its longitudinal axis which extends perpendicular to the mounting wall 34. The front end of the female die member 36g extends through and projects beyond the front surface of the mounting wall 34. The female die member 36g has an annular groove 40g in its outer surface adjacent the front end of the member. The groove 40g is of a depth and width equal to the height and width of the U-shaped portion 12 of the duct joining member 10. The female die members 36a–36f are of the same construction as the female die member 36g except for the depth of the grooves in the female die members. The grooves in the female die members 36a–36f vary in depth with the groove in the female die member 36a being the shallowest and the other grooves progressively increasing in depth up to the depth of the groove 40g in the female die member 36g.

The male die member 38g is a cylindrical member which is supported for rotation about its longitudinal axis which extends perpendicular to the mounting wall 34. The front end of the male die member 38g extends through and projects beyond the front surface of the mounting wall 34. The front end of the male die member 38g has an annular rib 42g which extends radially outwardly therefrom and extends into the groove 40g in the female die member 36g. The rib 42g is of such a height that it extends to a point spaced from the bottom of the groove 40g. The outer surface of the male die member 38g is spaced from the outer surface of the female die member 36g a distance which is substantially equal to the thickness of the sheet metal strip used to form a duct joining member 10. Each of the male die members 38a–38f are of the same construction as the male die member 38g except that the height of each of the ribs corresponds to the depth of the groove in its mating female die member.

A slitting member 44 is mounted on the mounting wall 34 adjacent to but spaced from the female die member 36g. The slitting member 44 is a cylindrical member which is supported for rotation about its longitudinal axis which extends perpendicular to the mounting wall 34 and in horizontal alignment with the longitudinal axis of the female die member 36g. The front end of the slitting member extends through and projects beyond the front surface of the mounting wall 34. The slitting member 44 has an annular groove 46 in its outer surface adjacent its front end. The groove 46 is of the same size and and is in horizontal alignment with the groove 40g in the female die member 36g. A plurality of circumferentially spaced slitting teeth 48 extend radially outwardly from the slitting member 42 at the front edge of the groove 46.

A cylindrical anvil member 50 is mounted on the mounting wall 34 vertically beneath and parallel to the slitting member 44. The anvil member 50 extends through and projects beyond the front surface of the mounting wall 34. An annular groove 52 is provided in the outer surface of the anvil member. The groove 52 is positioned in vertical alignment with the slitting teeth 48 so that the slitting teeth extend into the groove. The outer surfaces of the slitting member 44 and the anvil member 50 are spaced apart a distance substantially equal to the thickness of the metal sheet being formed into a duct joining member.

A first guide member 54 is mounted on the mounting wall 34 between the female die member 36f and the female die member 36g. As shown in FIG. 2, the guide member 54 includes a mounting arm 56 which extends vertically along the front surface of the mounting wall 34 and is secured to the mounting wall by a screw 58. A horizontal guide arm 60 extends perpendicularly from the bottom end of the mounting arm 56 away from the mounting wall 34, and a vertical guide arm 62 extends vertically downwardly from the end of the horizontal guide arm 60. The guide member 54 is positioned so that the bottom surface of the horizontal guide arm 60 is in a horizontal plane which is tangent to the bottommost portion of the bottom surface of the groove in the female die member 36f, and the inner surface of the vertical guide arm 62 is in the same plane as the front wall of the groove in the female die member 36f.

A second guide member 64 is mounted on the mounting wall 34 between the female die member 36g and the slitting member 44. As shown in FIG. 3, the second guide member 64 includes a mounting arm 66 extending vertically along the front surface of the mounting wall 34 and secured thereto by a screw 68. A horizontal guide arm 70 extends perpendicularly from the bottom end of the mounting arm 66 away from the mounting wall 34. A vertical guide arm 72 extends downwardly from the horizontal guide arm 70 at a point between the ends of the horizontal guide arm. The second guide member 64 is positioned with the bottom surface of the horizontal guide arm 70 being in a horizontal plane which is tangental to the bottommost portion of the bottom surface of the groove 40g in the female die member 36g, and the front surface of the vertical guide arm 72 being in the same plane as the back surface of the groove 40g.

A third guide member 74 is mounted on the mounting wall 34 between the slitting member 44 and the end of the mounting wall 34. As shown in FIG. 4, the third guide member 74 includes a mounting arm 76 extending vertically along the front surface of the mounting wall 34 and secured thereto by a screw 78. A horizontal guide arm 80 extends perpendicularly from the bottom end of the mounting arm 76 away from the mounting wall. The third guide member 74 is positioned with the bottom surface of the horizontal guide arm 80 being in the same horizontal plane as the bottom surface of the horizontal guide arm 70 of the second guide member 64.

The guide plate 35 extends horizontally along the front side of the mounting wall 34 with the top surface of the guide plate being tangent to the lowermost point of the non grooved surfaces of the male die members 38a–38g and the anvil 50. As shown in FIGS. 2 and 3, the guide plate 35 is spaced from the mounting wall 34 along the male die members 38a–38g and the anvil 50. However, as shown in FIG. 4, the guide plate 35 extends up to the mounting wall 34 at the ends of the mounting wall. The apparatus 30 includes power means, not shown, for simultaneously rotating the female die members 36a–36g, the male die members 38a–38g, the slitter 44 and the anvil 50 at the same speed. The female die members 36a–36g and the slitter 44 are all rotated in one direction, clockwise as viewed in FIG. 1, and the male die members 38a–38g and the anvil 50 are all rotated in the opposite direction, counter clockwise as viewed in FIG. 1.

To form a duct joining member 10 of the present invention by the forming apparatus 30, one starts with an elongated, flat sheet metal strip 75. One end of the metal strip 75 is placed on the end of the guide plate 35 adjacent the female die member 36a and the male die member 38a. The end of the strip is fed between the female and male die members 36a and 38a with a side edge 77 of the strip 75 being adjacent the mounting wall 34. As the strip is fed between the female and male die members 36a and 38a, the mating ribs and grooves in the die members deform the strip to form a shallow U-shaped portion between the side edges of the strip. Also, the engagement of the counter rotating die members with the strip causes the strip to move longitudinally along between the die members. Thus, the shallow U-shaped portion is formed longitudinally along the entire length of the strip.

The strip then passes sequently between the other pairs of mating female and male die members 36b-36g and 38b-38g. As the strip passes between each pair of mating die members, the U-shaped portion is made deeper because of the increasing depth of the groove in the female die members and increasing length of the rib on the male die members. The last pair of female and male die members 36g and 38g form the U-shaped portion to its final depth. The engagement between each pair of counter rotating die members and the strip 75, maintains the movement of the strip along the path between the die members. When the strip 75 leaves the mating female and male die members 36f and 38f, it passes under the first guide member 54. As shown in FIG. 2, the end of the U-shaped portion engages the bottom surface of the horizontal guide arm 60 and the front leg of the U-shaped portion engages the inner surface of the vertical guide arm 62. This properly guides the strip between the last pair of mating female and male die members 36g and 38g.

When the strip leaves the last pair of mating female and male die members 36g and 38g, the strip passes under the second guide member 64. As shown in FIG. 3, the strip 75 passes under the second guide member 64 with the end of the U-shaped portion engaging the bottom surface of the horizontal guide arm 70 and the back leg of the U-shaped portion engaging the front surface of the vertical guide arm 72. This properly guides the strip between the slitter wheel 44 and the anvil 50.

The strip passes between the slitter wheel 44 and the anvil 50 with the U-shaped portion passing through the groove 46 and the slitter teeth 48 passing along the outer surface of a leg of the U-shaped portion as shown in FIG. 4. Thus, the slitter teeth 48 engage the front of the strip at the junction with the U-shaped portion so as to cut a plurality of longitudinally spaced slits 18 in the strip. When the strip leaves the slitting wheel 44, it passes under the third guide member 74 with the end of the U-shaped portion engaging the bottom surface of the horizontal guide arm 80. Thus, the apparatus 30 forms the duct joining member 10 with the female and male die members 36a–36g and 38a–38g forming the U-shaped portion 12 between the co-planar flanges 14 and 16, and the slitter wheel 44 and anvil 50 forming the longitudinally spaced slits 18 at the junction of the flange 16 and the U-shaped portion 12.

It will be obvious to those skilled in the art that the invention may find wide application with appropriate modification to meet the individual design circumstances, but without substantial departure from the essence of the invention.

What is claimed is:

1. In a duct system having a rectangular duct with four sides, each side having a flange and a duct joining member coupling said duct with a body, said duct joining members each comprising an elongated metal strip having an intermediate U-shaped portion with substantially parallel first and second legs and receiving therebetween a respective one of the upstanding flanges at the end of said duct, a first flange extending from the end of the first leg of said U-shaped portion for being positioned over a side at the end of said duct, and a second flange, extending from the end of the second leg of said U-shaped portion received into an opening of said body and being bent for securing same with said body, said second flanges including means permitting ease of bending thereof.

2. The means in accordance with claim 1 in which the means to permit ease of bending the said second flange of each duct joining member comprises a plurality of slits in said second flange.

3. The means in accordance with claim 2 in which the slits in the second flange of each duct joining member extend through the said flange along the junction of the said flange and the U-shaped portion.

4. The means in accordance with claim 3 in which the U-shaped portion of each duct joining member extends longitudinally along the strip and the flanges extend from the U-shaped portion to the side edges of the strip in each duct joining member.

5. The means in accordance with claim 4 in which the flanges of each duct joining member are substantially co-planar.

* * * * *